United States Patent
Al-Yami et al.

(10) Patent No.: US 11,098,232 B2
(45) Date of Patent: Aug. 24, 2021

(54) LUBRICANTS FOR WATER-BASED DRILLING FLUIDS

(71) Applicant: Saudi Arabian Oil Company, Dhahran (SA)

(72) Inventors: Abdullah Al-Yami, Dhahran (SA); Hussain AlBahrani, Qatif (SA); Vikrant Wagle, Abqaiq (SA); Ali Safran, Dhahran (SA); Naser AlHareth, Dhahran (SA); Abdulaziz Alhelal, Ras Tanura (SA); Abdulla Hussein Awadh, Mohammedyah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/856,288

(22) Filed: Apr. 23, 2020

(65) Prior Publication Data

US 2020/0248061 A1 Aug. 6, 2020

Related U.S. Application Data

(63) Continuation of application No. 15/660,118, filed on Jul. 26, 2017, now Pat. No. 10,662,363.

(Continued)

(51) Int. Cl.
| | |
|---|---|
| *C09K 8/24* | (2006.01) |
| *E21B 21/00* | (2006.01) |
| *C09K 8/22* | (2006.01) |
| *C09K 8/467* | (2006.01) |
| *C10M 173/00* | (2006.01) |
| *C04B 24/02* | (2006.01) |

(Continued)

(52) U.S. Cl.
CPC ............ *C09K 8/24* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/20* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01); *C04B 2103/46* (2013.01); *C04B 2111/00068* (2013.01); *C04B 2201/20* (2013.01); *C09K 8/03* (2013.01); *C09K 8/28* (2013.01); *C09K 8/514* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2020/017* (2020.05); *C10N 2020/02* (2013.01); *C10N 2020/04* (2013.01); *C10N 2030/06* (2013.01); *C10N 2040/22* (2013.01); *C10N 2040/40* (2020.05); *C10N 2050/013* (2020.05); *Y02W 30/91* (2015.05)

(58) Field of Classification Search
None
See application file for complete search history.

(56) References Cited

U.S. PATENT DOCUMENTS

| | | |
|---|---|---|
| 2,589,949 A | 3/1952 | Meadors |
| 2,782,163 A | 2/1957 | Wilson |

(Continued)

FOREIGN PATENT DOCUMENTS

| | | |
|---|---|---|
| AU | 5117264 A | 5/1967 |
| CA | 2495811 A1 | 3/2004 |

(Continued)

OTHER PUBLICATIONS

Office Action dated Mar. 30, 2020 pertaining to U.S. Appl. No. 16/696,166, filed Nov. 26, 2019, 56 pgs.

(Continued)

*Primary Examiner* — John J Figueroa
(74) *Attorney, Agent, or Firm* — Dinsmore & Shohl LLP

(57) ABSTRACT

Embodiments are directed to a lubricant package for water based drilling fluids. The lubricant package includes water, a polyethylene glycol, and a lubricating agent. The lubricating agent includes triethanolamine, or a $C_{12}$-$C_{14}$ alcohol ethoxylate, or a combination of triethanolamine and $C_{12}$-$C_{14}$ alcohol ethoxylate. The weight ratio of the polyethylene glycol to the lubricating agent in the lubricant package is from 1:2 to 2:1. Embodiments are also directed to a water-based drilling fluid composition including an aqueous base fluid, one or more additives, and the lubricant package for water based drilling fluids.

20 Claims, No Drawings

Related U.S. Application Data

(60) Provisional application No. 62/454,189, filed on Feb. 3, 2017, provisional application No. 62/454,192, filed on Feb. 3, 2017.

(51) Int. Cl.

| | | |
|---|---|---|
| *C04B 28/02* | (2006.01) | |
| *E21B 43/25* | (2006.01) | |
| *C09K 8/03* | (2006.01) | |
| *C04B 28/04* | (2006.01) | |
| *C04B 28/08* | (2006.01) | |
| *C09K 8/74* | (2006.01) | |
| *C09K 8/20* | (2006.01) | |
| *B01F 17/00* | (2006.01) | |
| *C09K 8/40* | (2006.01) | |
| *E21B 33/14* | (2006.01) | |
| *C09K 8/035* | (2006.01) | |
| *C09K 8/08* | (2006.01) | |
| *C09K 8/42* | (2006.01) | |
| *C09K 8/48* | (2006.01) | |
| *C04B 24/08* | (2006.01) | |
| *C09K 8/487* | (2006.01) | |
| *C04B 7/52* | (2006.01) | |
| *C09K 8/46* | (2006.01) | |
| *C09K 8/04* | (2006.01) | |
| *C04B 14/06* | (2006.01) | |
| *C04B 38/02* | (2006.01) | |
| *C10M 105/18* | (2006.01) | |
| *C10M 105/62* | (2006.01) | |
| *C10M 107/34* | (2006.01) | |
| *C10M 111/04* | (2006.01) | |
| *C09K 8/32* | (2006.01) | |
| *C09K 8/36* | (2006.01) | |
| *C10M 173/02* | (2006.01) | |
| *C10N 20/02* | (2006.01) | |
| *C10N 20/04* | (2006.01) | |
| *C10N 20/00* | (2006.01) | |
| *C10N 30/06* | (2006.01) | |
| *C10N 40/22* | (2006.01) | |
| *C10N 50/00* | (2006.01) | |
| *C10N 40/00* | (2006.01) | |
| *C09K 8/514* | (2006.01) | |
| *C09K 8/28* | (2006.01) | |
| *C04B 103/40* | (2006.01) | |
| *C04B 103/46* | (2006.01) | |
| *C04B 111/00* | (2006.01) | |

(56) References Cited

U.S. PATENT DOCUMENTS

| | | | |
|---|---|---|---|
| 2,786,027 A | 3/1957 | Salathiel | |
| 3,000,826 A * | 9/1961 | Gililland | C10M 173/02 |
| | | | 508/179 |
| 3,044,959 A | 7/1962 | Martin | |
| 3,048,538 A | 8/1962 | Rosenberg et al. | |
| 3,319,714 A | 5/1967 | Knox | |
| 3,353,603 A | 11/1967 | Knight | |
| 3,720,610 A | 3/1973 | Erasmus | |
| 3,816,351 A | 6/1974 | Lancz | |
| 3,849,316 A | 11/1974 | Motley et al. | |
| 3,953,337 A | 4/1976 | Walker et al. | |
| 4,140,650 A | 2/1979 | Wilde | |
| 4,141,843 A | 2/1979 | Watson | |
| 4,172,800 A | 10/1979 | Walker | |
| 4,217,231 A | 8/1980 | King | |
| 4,280,943 A | 7/1981 | Bivens et al. | |
| 4,519,923 A | 5/1985 | Hori et al. | |
| 4,561,985 A | 12/1985 | Glass, Jr. | |
| 4,588,032 A | 5/1986 | Weigand et al. | |
| 4,626,362 A | 12/1986 | Dickert et al. | |
| 4,658,036 A | 4/1987 | Schilling | |
| 4,687,516 A | 8/1987 | Burkhalter et al. | |
| 4,704,214 A | 11/1987 | Russell et al. | |
| 4,719,021 A | 1/1988 | Branch, III | |
| 4,842,065 A | 6/1989 | McClure | |
| 5,007,489 A * | 4/1991 | Enright | C09K 8/06 |
| | | | 175/65 |
| 5,016,711 A | 5/1991 | Cowan | |
| 5,105,885 A | 4/1992 | Bray et al. | |
| 5,109,042 A | 4/1992 | Stephens | |
| 5,275,654 A | 1/1994 | Cowan | |
| 5,298,070 A | 3/1994 | Cowan | |
| 5,314,022 A | 5/1994 | Cowan et al. | |
| 5,330,662 A | 7/1994 | Jahnke et al. | |
| 5,348,993 A | 9/1994 | Daeumer et al. | |
| 5,399,548 A | 3/1995 | Patel et al. | |
| 5,474,701 E | 12/1995 | Jaquess et al. | |
| RE35,163 E | 2/1996 | Christensen et al. | |
| 5,586,608 A | 12/1996 | Clark et al. | |
| 5,593,953 A | 1/1997 | Malchow | |
| 5,593,954 A | 1/1997 | Malchow | |
| 5,602,082 A | 2/1997 | Hale et al. | |
| 5,618,780 A | 4/1997 | Argillier et al. | |
| 5,683,973 A | 11/1997 | Post et al. | |
| 5,728,210 A | 3/1998 | Moran et al. | |
| 5,744,432 A * | 4/1998 | Barnhorst | C10M 145/34 |
| | | | 508/431 |
| 5,830,831 A | 11/1998 | Chan et al. | |
| 5,850,880 A | 12/1998 | Moran et al. | |
| 5,996,693 A | 12/1999 | Heathman | |
| 6,063,737 A | 5/2000 | Haberman et al. | |
| 6,258,756 B1 | 7/2001 | Hayatdavoudi | |
| 6,267,716 B1 | 7/2001 | Quintero | |
| 6,632,779 B1 * | 10/2003 | Vollmer | C09K 8/08 |
| | | | 507/209 |
| 6,803,346 B1 | 10/2004 | Bailey et al. | |
| 6,972,274 B1 | 12/2005 | Slikta et al. | |
| 6,974,852 B2 | 12/2005 | Stanger et al. | |
| 7,081,438 B2 | 7/2006 | Horton | |
| 7,262,152 B2 | 8/2007 | Monfreux-Gaillard et al. | |
| 7,318,477 B2 | 1/2008 | Hou | |
| 7,435,706 B2 | 10/2008 | Mueller et al. | |
| 7,799,742 B2 | 9/2010 | Dino | |
| 7,893,010 B2 | 2/2011 | Ali et al. | |
| 7,951,755 B2 | 5/2011 | Wu et al. | |
| 8,252,728 B2 | 8/2012 | Karagianni et al. | |
| 8,403,051 B2 | 3/2013 | Huang et al. | |
| 8,563,479 B2 | 10/2013 | Amanullah et al. | |
| 8,703,658 B2 | 4/2014 | Smith | |
| 8,741,989 B2 | 6/2014 | Martin et al. | |
| 8,932,997 B2 | 1/2015 | Merli et al. | |
| 8,936,111 B2 | 1/2015 | Maghrabi et al. | |
| 9,006,151 B2 | 4/2015 | Amanullah et al. | |
| 9,034,800 B2 | 5/2015 | Harris et al. | |
| 9,127,192 B2 | 9/2015 | Maghrabi et al. | |
| 9,175,205 B2 | 11/2015 | Amanullah et al. | |
| 9,249,052 B2 | 2/2016 | Kawakami | |
| 10,287,476 B2 | 5/2019 | Al-Yami et al. | |
| 10,287,477 B2 | 5/2019 | Al-Yami et al. | |
| 10,494,559 B2 | 12/2019 | Al-Yami et al. | |
| 10,526,520 B2 | 1/2020 | Al-Yami et al. | |
| 10,538,692 B2 | 1/2020 | Al-Yami et al. | |
| 2001/0027880 A1 | 10/2001 | Brookey | |
| 2003/0017953 A1 | 1/2003 | Horton et al. | |
| 2003/0127903 A1 | 7/2003 | Quintero | |
| 2004/0108113 A1 | 6/2004 | Luke et al. | |
| 2004/0116304 A1 | 6/2004 | Wu et al. | |
| 2004/0144537 A1 | 7/2004 | Reddy et al. | |
| 2005/0049147 A1 | 3/2005 | Patel et al. | |
| 2006/0111245 A1 | 5/2006 | Carbajal et al. | |
| 2006/0174805 A1 | 8/2006 | Chatterji et al. | |
| 2006/0183842 A1 | 8/2006 | Johnson | |
| 2006/0254770 A1 | 11/2006 | Hou | |
| 2007/0015678 A1 | 1/2007 | Rodrigues et al. | |
| 2007/0093393 A1 | 4/2007 | Navarrete et al. | |
| 2007/0191235 A1 | 8/2007 | Mas et al. | |

(56) References Cited

U.S. PATENT DOCUMENTS

| | | |
|---|---|---|
| 2008/0006404 A1 | 1/2008 | Reddy et al. |
| 2008/0171671 A1 | 7/2008 | Mueller et al. |
| 2008/0194432 A1 | 8/2008 | Heidlas et al. |
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0131285 A1 | 5/2009 | Wang et al. |
| 2009/0200033 A1 | 8/2009 | Kakadjian et al. |
| 2009/0260885 A1 | 10/2009 | Pomerleau |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0173804 A1 | 7/2010 | Van De Peer et al. |
| 2010/0263863 A1 | 10/2010 | Quintero et al. |
| 2010/0319915 A1 | 12/2010 | Bustos et al. |
| 2010/0326660 A1 | 12/2010 | Ballard et al. |
| 2011/0303414 A1 | 12/2011 | Seth et al. |
| 2011/0306524 A1 | 12/2011 | Smith |
| 2012/0000708 A1 | 1/2012 | van Zanten et al. |
| 2012/0018226 A1 | 1/2012 | Nzeadibe et al. |
| 2012/0241155 A1 | 9/2012 | Ali et al. |
| 2012/0329683 A1 | 12/2012 | Droger et al. |
| 2013/0079256 A1 | 3/2013 | Yang et al. |
| 2013/0092376 A1 | 4/2013 | Al-Subhi et al. |
| 2013/0126243 A1 | 5/2013 | Smith |
| 2013/0153232 A1 | 6/2013 | Bobier et al. |
| 2013/0190543 A1 | 7/2013 | Barnes et al. |
| 2013/0244913 A1 | 9/2013 | Maberry et al. |
| 2013/0303410 A1 | 11/2013 | Wagle et al. |
| 2013/0303411 A1 | 11/2013 | Wagle et al. |
| 2014/0024560 A1 | 1/2014 | Gonzalez Poche et al. |
| 2014/0024561 A1 | 1/2014 | Reddy |
| 2014/0073540 A1 | 3/2014 | Berry et al. |
| 2014/0102809 A1 | 4/2014 | King et al. |
| 2014/0121135 A1 | 5/2014 | Gamage et al. |
| 2014/0213489 A1 | 7/2014 | Smith |
| 2014/0318785 A1 | 10/2014 | Reddy et al. |
| 2014/0332212 A1 | 11/2014 | Ayers et al. |
| 2015/0024975 A1 | 1/2015 | Wagle et al. |
| 2015/0034389 A1 | 2/2015 | Perez |
| 2015/0080273 A1 | 3/2015 | Hatchman et al. |
| 2015/0087563 A1 | 3/2015 | Brege et al. |
| 2015/0159073 A1 | 6/2015 | Assmann et al. |
| 2015/0240142 A1 | 8/2015 | Kefi et al. |
| 2015/0299552 A1 | 10/2015 | Zamora et al. |
| 2016/0009981 A1 | 1/2016 | Teklu et al. |
| 2016/0024370 A1 | 1/2016 | Ba geri et al. |
| 2016/0069159 A1 | 3/2016 | Teklu et al. |
| 2016/0090523 A1 | 3/2016 | Ravi et al. |
| 2016/0177169 A1 | 6/2016 | Zhang |
| 2016/0186032 A1 | 6/2016 | Yu et al. |
| 2016/0237340 A1 | 8/2016 | Pandya et al. |
| 2016/0289529 A1 | 10/2016 | Nguyen |
| 2017/0009125 A1 | 1/2017 | Shaffer et al. |
| 2018/0223162 A1 | 8/2018 | Al-Yami et al. |
| 2018/0265763 A1 | 9/2018 | Leotaud et al. |

FOREIGN PATENT DOCUMENTS

| | | |
|---|---|---|
| CA | 2594108 A1 | 9/2008 |
| CA | 2810345 A1 | 3/2012 |
| CA | 2745017 A1 | 12/2012 |
| CN | 101421371 A | 4/2009 |
| CN | 102120158 A | 7/2011 |
| CN | 101240218 B | 12/2011 |
| CN | 102041138 B | 12/2011 |
| CN | 102321461 A | 1/2012 |
| CN | 102382697 A | 3/2012 |
| CN | 102373042 B | 8/2013 |
| CN | 102464974 B | 8/2013 |
| CN | 103320203 A | 9/2013 |
| CN | 102500141 B | 1/2014 |
| CN | 103571599 A | 2/2014 |
| CN | 102899152 B | 4/2014 |
| CN | 102899154 B | 4/2014 |
| CN | 102977940 B | 11/2014 |
| CN | 104130839 A | 11/2014 |
| CN | 104559954 A | 4/2015 |
| CN | 103351925 B | 7/2015 |
| CN | 102373053 B | 8/2015 |
| CN | 103571578 B | 8/2015 |
| CN | 104830513 A | 8/2015 |
| CN | 104877749 A | 9/2015 |
| CN | 104910881 A | 9/2015 |
| CN | 105038737 A | 11/2015 |
| CN | 103757640 B | 12/2015 |
| CN | 105112036 A | 12/2015 |
| CN | 103773041 B | 1/2016 |
| CN | 105441051 A | 3/2016 |
| CN | 104449893 B | 5/2016 |
| CN | 103555304 B | 6/2016 |
| CN | 105623814 A | 6/2016 |
| CN | 105778992 A | 7/2016 |
| CN | 105861135 A | 8/2016 |
| EP | 108546 A2 | 5/1984 |
| EP | 243067 A2 | 10/1987 |
| EP | 265563 A1 | 5/1988 |
| EP | 296655 A1 | 12/1988 |
| EP | 315243 A1 | 5/1989 |
| EP | 331158 A2 | 9/1989 |
| EP | 395815 A1 | 11/1990 |
| EP | 1003829 B1 | 5/2004 |
| EP | 1213270 B1 | 2/2005 |
| EP | 2708586 A1 | 3/2014 |
| GB | 2205748 A | 12/1988 |
| GB | 2283036 A | 4/1995 |
| GB | 2343447 A | 5/2000 |
| JP | 07109472 A | 4/1995 |
| JP | 2006001789 A | 1/2006 |
| WO | 8911516 A1 | 11/1989 |
| WO | 9402565 A1 | 2/1994 |
| WO | 9530818 A1 | 11/1995 |
| WO | 9640836 A1 | 12/1996 |
| WO | 9836151 A1 | 8/1998 |
| WO | 9907816 A1 | 2/1999 |
| WO | 9955634 A1 | 11/1999 |
| WO | 0123703 A1 | 4/2001 |
| WO | 03093641 A1 | 11/2003 |
| WO | 2004076561 A1 | 9/2004 |
| WO | 2006012622 A2 | 2/2006 |
| WO | 2006120151 A2 | 11/2006 |
| WO | 2007003885 A3 | 5/2007 |
| WO | 2007118328 A1 | 10/2007 |
| WO | 2008081158 A2 | 7/2008 |
| WO | 2009060405 A1 | 5/2009 |
| WO | 2009138383 A1 | 11/2009 |
| WO | 2010030275 A1 | 3/2010 |
| WO | 2012101594 A1 | 8/2012 |
| WO | 2012158645 A1 | 11/2012 |
| WO | 2013055843 A1 | 4/2013 |
| WO | 2013154435 A1 | 10/2013 |
| WO | 2014107391 A1 | 7/2014 |
| WO | 2014164381 A1 | 10/2014 |
| WO | 2014193507 A1 | 12/2014 |
| WO | 2015000077 A1 | 1/2015 |
| WO | 2015006101 A1 | 1/2015 |
| WO | 2015038117 A1 | 3/2015 |
| WO | 2015041649 A1 | 3/2015 |
| WO | 2016189062 A1 | 12/2016 |

OTHER PUBLICATIONS

Office Action dated Apr. 14, 2020 pertaining to U.S. Appl. No. 15/496,794, filed Apr. 25, 2017, 47 pgs.

Office Action dated Apr. 22, 2020 pertaining to U.S. Appl. No. 15/586,543, filed May 4, 2017, 33 pgs.

Office Action dated Mar. 18, 2020 pertaining to U.S. Appl. No. 15/581,136, filed Apr. 28, 2017, 29 pgs.

Office Action dated Apr. 4, 2019 pertaining to U.S. Appl. No. 15/586,543, filed May 4, 2017, 23 pgs.

Office Action dated Apr. 8, 2019 pertaining to U.S. Appl. No. 15/660,118, filed Jul. 26, 2017, 76 pgs.

(56) References Cited

OTHER PUBLICATIONS

US Office Action dated Apr. 11, 2019 pertaining to U.S. Appl. No. 15/628,892, filed Jun. 21, 2017, 34 pgs.
US Notice of Allowance dated Apr. 24, 2019 pertaining to U.S. Appl. No. 15/485,724, filed Apr. 12, 2017, 23 pgs.
US Notice of Allowance dated Apr. 26, 2019 pertaining to U.S. Appl. No. 15/489,930, filed Apr. 18, 2017, 14 pgs.
Notice of Allowance and Fee(s) Due dated May 15, 2019 pertaining to U.S. Appl. No. 15/922,077, filed Mar. 15, 2018, 27 pgs.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs.
Office Action dated Jun. 14, 2019 pertaining to U.S. Appl. No. 15/489,854, filed Apr. 18, 2017, 20 pgs.
Office Action dated Jun. 24, 2019 pertaining to U.S. Appl. No. 16/037,493, filed Jul. 17, 2018, 31 pgs.
Notice of Allowance and Fee(s) Due dated Jul. 22, 2019 pertaining to U.S. Appl. No. 15/922,065, filed Mar. 15, 2018, 27 pgs.
Notice of Allowance and Fee(s) Due dated Jul. 31, 2019 pertaining to U.S. Appl. No. 15/628,892, filed Jun. 21, 2017, 19 pgs.
Office Action dated Aug. 12, 2019 pertaining to U.S. Appl. No. 15/612,397, filed Jun. 2, 2017, 45 pgs.
Final Rejection dated Aug. 5, 2019 pertaining to U.S. Appl. No. 15/586,543, filed May 4, 2017, 38 pgs.
Office Action dated Jul. 30, 2019 pertaining to U.S. Appl. No. 15/581,136, filed Apr. 28, 2017, 29 pgs.
US Office Action dated Jul. 3, 2019 pertaining to U.S. Appl. No. 15/496,794, filed Apr. 25, 2017, 52 pgs.
US Office Action dated Jul. 2, 2019 pertaining to U.S. Appl. No. 15/586,555, filed May 4, 2017, 92 pgs.
Tridecyl Alcohol Ethoxylate, 2016, retrieved Jun. 28, 2019 from http://webcache.goggleusercontent.com/search?q=cache:OiTX5lz527kJ:https://emochemicals.com/Ethoxylates/Ethoxylates/TRIDECYL-ALCOHOL-ETHOXYLATE&hl=en&gl=us&strip=1&vwsrc=0 (Year: 2016).
US Office Action dated Jul. 2, 2019 pertaining to U.S. Appl. No. 16/039,525, filed Jul. 19, 2018, 75 pgs.
Notice of Allowance and Fee(s) Due dated Aug. 21, 2019 pertaining to U.S. Appl. No. 15/920,879, filed Mar. 14, 2018, 13 pgs.
Notice of Allowance and Fee(s) Due dated Aug. 28, 2019 pertaining to U.S. Appl. No. 16/451,167, filed Jun. 25, 2019, 43 pgs.
Examination Report for Application No. GC2018-34707 dated Jul. 21, 2019.
Examination Report for Application No. GC2018-34710 dated Jul. 22, 2019.
Examination Report for Application No. GC2018-34701 dated Jul. 29, 2019.
Examination Report for Application No. 3,052,276 dated Sep. 5, 2019.
Examination Report for Application No. GC2018-34699 dated Aug. 21, 2019.
Examination Report for Application No. GC2018/34711 dated Jul. 28, 2019.
Notice of Allowance and Fee(s) Due dated Oct. 11, 2019 pertaining to U.S. Appl. No. 16/037,493, filed Jul. 17, 2018, 17 pgs.
Notice of Allowance and Fee(s) Due dated Oct. 2, 2019 pertaining to U.S. Appl. No. 15/489,854, filed Apr. 18, 2017, 13 pgs.
Examination Report for Application No. GC2018-34700 dated Aug. 21, 2019.
Notice of Allowance and Fee(s) Due dated Nov. 5, 2019 pertaining to U.S. Appl. No. 15/586,555, filed May 1, 2017, 29 pg.
Office Action dated Oct. 23, 2019 pertaining to U.S. Appl. No. 15/660,118, filed Jul. 26, 2017, 45 pgs.
Office Action dated Oct. 24, 2019 pertaining to U.S. Appl. No. 16/202,600, filed Nov. 28, 2018, 84 pgs.
Office Action dated Oct. 22, 2019 pertaining to U.S. Appl. No. 16/039,525, filed Jul. 19, 2018, 32 pgs.
Nelson, E.B. Well cementing, vol. 28, pp. 5-25 through 5-34, ISBN 0-444-88751-2 (Year: 1990).

Office Action dated Dec. 5, 2019 pertaining to U.S. Appl. No. 15/496,794, filed Apr. 25, 2017, 34 pgs.
Office Action dated Dec. 13, 2019 pertaining to U.S. Appl. No. 15/586,543, filed May 4, 2017, 27 pgs.
Office Action dated Dec. 19, 2019 pertaining to U.S. Appl. No. 15/612,397, filed Jun. 2, 2017, 34 pgs.
Office Action dated Dec. 13, 2019 pertaining to U.S. Appl. No. 15/581,136, filed Apr. 28, 2017, 33 pgs.
Notice of Allowance and Fee(s) Due dated Jan. 17, 2020 pertaining to U.S. Appl. No. 15/660,118, filed Jul. 26, 2017, 10 pgs.
Notice of Allowance and Fee(s) Due dated Jan. 9, 2020 pertaining to U.S. Appl. No. 16/002,669, filed Jun. 7, 2018, 35 pgs.
Examination Report for Application No. GC2018-34705 dated Oct. 27, 2019.
Examination Report pertaining to Application No. Gc 2018-34707 dated Dec. 17, 2019.
Examination Report for Application No. GC2018-34700 dated Dec. 18, 2019.
Examination Report for Application No. GC2018-34699 dated Dec. 31, 2019.
Examination Report for Application No. GC2018-34697 dated Dec. 26, 2019.
Notice of Allowance and Fee(s) Due dated Mar. 5, 2020 pertaining to U.S. Appl. No. 16/002,669 filed Jun. 7, 2018, 12 pgs.
Office Action dated Feb. 27, 2020 pertaining to U.S. Appl. No. 16/202,600, filed Nov. 28, 2018, 22 pgs.
Notice of Allowance and Fee(s) due dated Mar. 3, 2020 pertaining to U.S. Appl. No. 16/039,525, filed Jul. 19, 2018, 23 pgs.
Notice of Allowance and Fee(s) due dated Mar. 26, 2020 pertaining to U.S. Appl. No. 15/612,397, filed Jun. 2, 2017, 26 pgs.
Akkutlu et al., "Molecular Dynamics Simulation of Adsorpotion from Microemulsions and Surfactant Micellar Solutions at Solid-Liquid, Liquid-Liquid and Gas-Liquid Interfaces", Tech Connector World Innovation Conference & Expo, Jun. 15-18, 2014, Washington D.C.
Fraser, Greig, "Method for Determining the Bioconcentration Factor of Linear Alcohol Ethoxylates", SPE Offshore Europe Oil and Gas Conference and Exhibition, Aberdeen, GB, Sep. 8-11, 2009, Society of Petroleum Engineers.
Inoue et al., "Interactions Between Engine Oil Additive", J. Japan Petrol. Inst., 1981, 24 (2), 101-107.
Joshi et al., "Physiochemical Behaviour of Ternary System Based on Coconut Oil/C12/E8/n-pentanol/Water", J. Surface Sci. Technol., 2013, 29 (1-2), 1-13.
Lim, Jongchoo, "Solubilization of Mixture of Hydrocarbon Oils by C12e 8 Nonionic Surfactant Solution", Journal of the Korean Industrial and Engineering Chemistry, 2008, 19, 59-65.
Luan et al., "Foaming Property for Anionic-Nonionic Gemini Surfactant of Polyalkoxylated Ether Sulfonate", Oilfield Chemistry, Tsinghua Tongfang Knowledge Network Technology Co., Ltd., 2006.
Min et al., "Research on Coking Dust Wettability of Strong Cohesiveness and Easy Mudding", Safety in Coal Mines, Tsinghua Tongfang Knowledge Network Technology Co., Ltd., 2006.
Mitchell et al., "Measurement of HTHP Fluid-Loss Equipment and Test Fluids with Thermocouples", American Association of Drilling Engineers, AADE Drilling Fluids Conference, Houston TX, Apr. 6-7, 2004.
Nelson, Erik B., "Well Cementing Fundamentals", Oilfield Review, Summer 2012, vol. 24, No. 2, 59-60, Schlumberger.
Paswan et al., "Development of Jatropha oil-in-water emulsion drilling mud system", Journal of Petroleum Science and Engineering, 2016, vol. 144, p. 10-18.
Sun et al., "Synthesis and Salt Tolerance Determination of Aliphatic Alcohol Polyoxyethylene Ethers Sulfonate Series", Journal of Chemical Industry & Engineering, Tsinghua Tongfang Knowledge Network Technology Co., Ltd., 2006.
International Search Report and Written Opinion pertaining to International Application No. PCT/US2018/014986 filed Jan. 24, 2018.
International Search Report and Written Opinion pertaining to International Application No. PCT/US2018/015191 filed Jan. 25 2018.

(56) References Cited

OTHER PUBLICATIONS

International Search Report and Written Opinion Petaining to International Application No. PCT/US2018/015140.
International Search Report and Written Opinion dated Apr. 3, 2018 Petaining to International Application No. PCT/US2018/016182 pp. 1-13.
Non-Final Office Action dated Jan. 16, 2018 pertaining to U.S. Appl. No. 15/485,479, filed Apr. 12, 2017.
Non-Final Office Action dated Apr. 30, 2018 pertaining to U.S. Appl. No. 15/586,543, filed May 4, 2017.
Non-Final Office Action dated May 1, 2018 pertaining to U.S. Appl. No. 15/496,794, filed Apr. 25, 2017.
International Search Report and Written Opinion dated Apr. 3, 2018, pertaining to International Application PCT/US2018/016447, filed Feb. 1, 2018, 14 pages.
International Search Report and Written Opinion dated Apr. 20, 2018, pertaining to International Application PCT/US2018/016365, filed Feb. 1, 2018, 16 pages.
International Search Report and Written Opinion dated Apr. 20, 2018, pertaining to International Application PCT/US2018/016414, filed Feb. 1, 2018, 14 pages.
International Search Report and Written Opinion dated Apr. 16, 2018, pertaining to International Application PCT/US2018/016415, filed Feb. 1, 2018, 13 pages.
Shell Chemicals, HLB numbers, solvent miscibility and emulsification characteristics of NEODOL ethoxylates, retrieved Apr. 26, 2018 from https://www.shel.com/business-customers/chemicals/our-products/higher-olefins-and-derivatives/neodol-alchols-and-ethoxylatest_jcr_contents/par/tabbedcontent/tab_1780231844/textimage.
Non-Final Office Action dated May 4, 2018 pertaining to U.S. Appl. No. 15/628,892, filed Jun. 21, 2017.
International Search Report and Written Opinion dated May 8, 2018 pertaining to International Application No. PCT/US2018/015631.
International Search Report and Written Opinion dated May 14, 2018 pertaining to International Application No. PCT/US2018/015640 filed Jan. 29, 2018, 16 pages.
International Search Report and Written Opinion dated May 9, 2018 pertaining to International Application No. PCT/US2018/015638 filed Jan. 29, 2018, 15 pages.
Non-Final Office Action dated May 25, 2018 pertaining to U.S. Appl. No. 15/485,724, 6 pages.
International Search Report and Written Opinion dated May 29, 2018 pertaining to International Application No. PCT/US2018/015207 filed Jan. 25, 2018, 15 pages.
International Search Report and Written Opinion dated May 25, 2018, pertaining to International Application No. PCT/US2018/016167, filed Jan. 31, 2018, 20 pages.
Office Action pertaining to U.S. Appl. No. 15/489,927 dated Jul. 6, 2018.
Office Action pertaining to U.S. Appl. No. 16/002,672 dated Sep. 14, 2018.
Office Action pertaining to. U.S. Appl. No. 16/002,669 dated Sep. 21, 2018.
Final Rejection dated Oct. 9, 2018 pertaining to U.S. Appl. No. 15/496,794.
Sabicol TA Series Synthetic Alcohol Ethoxylates, SGS, 2013, pp. 1-3, retrieved Sep. 28, 2018 from http://www.latro.com.tr/upload/1499842623-t2.pdf (Year:2013).
Office Action dated Dec. 12, 2018 pertaining to U.S. Appl. No. 15/581,136, filed Apr. 28, 2017.
Office Action dated Dec. 19, 2018 pertaining to U.S. Appl. No. 15/489,930, filed Apr. 18, 2017.
Notice of Allowance and Fee(s) Due dated Jan. 8, 2019 pertaining to U.S. Appl. No. 15/485,479, filed Apr. 12, 2017.
Office Action dated Jan. 17, 2019 pertaining to U.S. Appl. No. 15/485,724, filed Apr. 12, 2017.
Office Action dated Feb. 11, 2019 pertaining to U.S. Appl. No. 15/496,794, filed Apr. 25, 2017, 16 pgs.
Office Action dated Feb. 11, 2019 pertaining to U.S. Appl. No. 15/920,879, filed Mar. 14, 2018, 68 pgs.
Office Action dated Feb. 7, 2019 pertaining to U.S. Appl. No. 16/002,669, filed Jun. 7, 2018, 54 pgs.
Office Action dated Feb. 21, 2019 pertaining to U.S. Appl. No. 16/037,493, filed Jul. 17, 2018, 52 pgs.
Office Action dated Jan. 24, 2019 pertaining to U.S. Appl. No. 15/489,854, filed Apr. 18, 2017, 46 pgs.
Office Action dated Feb. 5, 2019 pertaining to U.S. Appl. No. 15/612,397, filed Jun. 2, 2017, 67 pgs.
Office Action dated Feb. 27, 2019 pertaining to U.S. Appl. No. 15/922,077, filed Mar. 15, 2018, 69 pgs.
Notice of Allowance and Fee(s) Due dated Feb. 21, 2019 pertaining to U.S. Appl. No. 15/489,927, filed Apr. 18, 2017, 27 pgs.
Office Action dated Mar. 13, 2019 pertaining to U.S. Appl. No. 15/922,065, filed Mar. 15, 2018, 77 pgs.
Office Action dated Mar. 27, 2019 pertaining to U.S. Appl. No. 15/581,136, filed Apr. 28, 2017, 20 pgs.
Notice of Allowance dated Jun. 29, 2020 pertaining to U.S. Appl. No. 15/581,136, filed Apr. 28, 2017, 15 pgs.
Notice of Allowance dated Jul. 22, 2020 pertaining to U.S. Appl. No. 15/586,543, filed May 4, 2017, 6 pgs.
Office Action dated Jul. 13, 2020 pertaining to U.S. Appl. No. 16/653,357, filed Oct. 15, 2019, 57 pgs.
Notice of Allowance dated Jul. 29, 2020 pertaining to U.S. Appl. No. 16/696,166, filed Nov. 26, 2019, 11 pgs.
U.S. Notice of Allowance and Fee(s) Due dated Aug. 21, 2020 pertaining to U.S. Appl. No. 16/381,788, filed Apr. 11, 2019, 99 pgs.
Notice of Allowance and Fee(s) due dated Jan. 25, 2021 pertaining to U.S. Appl. No. 16/298,243, filed Mar. 11, 2019, 23 pgs.
Notice of Allowance and Fee(s) due dated Jan. 26, 2021 pertaining to U.S. Appl. No. 16/298,211, filed Mar. 11, 2019, 23 pgs.
Notice of Allowance and Fee(s) Due dated Feb. 16, 2021 pertaining to U.S. Appl. No. 16/381,783, filed Apr. 11, 2019, 31 pgs.
Office Action dated Sep. 24, 2020 pertaining to U.S. Appl. No. 16/381,783, filed Apr. 11, 2019, 100 pgs.
Office Action dated Sep. 29, 2020 pertaining to U.S. Appl. No. 16/735,073, filed Jan. 6, 2020, 61 pgs.
Office Action dated Sep. 30, 2020 pertaining to U.S. Appl. No. 16/774,410, filed Jan. 28, 2020, 63 pgs.
Office Action dated Oct. 8, 2020 pertaining to U.S. Appl. No. 16/298,243, filed Mar. 11, 2019, 106 pgs.
Office Action dated Oct. 8, 2020 pertaining to U.S. Appl. No. 16/298,211, filed Mar. 11, 2019, 91 pgs.
Office Action dated Nov. 23, 2020 pertaining to European Patent Application No. 19191792.1 filed Jan. 25, 2018.
Chinese Office Action dated Dec. 24, 2020 pertaining to application No. 201880009607.2 filed Jan. 25, 2018.
Datasheet of Barite by AMC Drilling Fluids and Products (Year: 2011).
Office Action dated Nov. 10, 2020 pertaining to U.S. Appl. No. 16/438,985, filed Jun. 12, 2019, 61 pgs.
Office Action dated Nov. 10, 2020 pertaining to U.S. Appl. No. 16/439,006, filed Jun. 12, 2019, 61 pgs.
Notice of Allowance and Fee(s) Due dated Nov. 16, 2020 pertaining to U.S. Appl. No. 16/653,357, filed Oct. 15, 2019, 19 pgs.

* cited by examiner

LUBRICANTS FOR WATER-BASED DRILLING FLUIDS

CROSS-REFERENCE TO RELATED APPLICATION

This application is a continuation application of U.S. patent application Ser. No. 15/660,118 filed Jul. 26, 2017, which claims priority to U.S. Provisional Patent Application Ser. Nos. 62/454,189 filed Feb. 3, 2017, and 62/454,192 filed Feb. 3, 2017, all of which are hereby incorporated herein by reference.

TECHNICAL FIELD

Embodiments of the present disclosure generally relate to drilling fluids, lubricants for drilling fluids, and methods for using drilling fluids containing lubricants. More specifically, embodiments of the present disclosure relate to lubricants for water based drilling fluids used for drilling oil wells and to water based drilling fluid compositions comprising the lubricants.

BACKGROUND

Oil and gas hydrocarbons are naturally occurring in some subterranean formations. During drilling operations, a drilling fluid, which may also be referred to as drilling mud, is circulated through the wellbore to cool the drill bit, to convey rock cuttings to the surface, or to support the wellbore against collapse of the wellbore and against intrusion of fluids from the formation, among other purposes. Additionally, friction between the drill string and piping and the wellbore during the drilling operations generates heat and leads to fatigue and wear on the drilling equipment. The water or oil in the drilling fluid may provide a lubricating functionality to reduce the coefficient of friction and thereby friction between the drilling equipment and wellbore.

However, there is an ongoing need for drilling fluids and drilling fluid lubricating additives, and specifically water-based drilling fluids and lubricating additives, which provide improved lubrication between the drilling equipment and wellbore during drilling operations.

SUMMARY

Embodiments of the present disclosure are directed to lubricant packages for water-based drilling fluids and associated drilling fluid compositions comprising the lubricant package.

According to one or more embodiments, a lubricant package for water based drilling fluids includes water, a polyethylene glycol, and a lubricating agent. The lubricating agent includes triethanolamine, or a $C_{12}$-$C_{14}$ alcohol ethoxylate, or a combination of triethanolamine and $C_{12}$-$C_{14}$ alcohol ethoxylate. Further, the weight ratio of the polyethylene glycol to the lubricating agent in the lubricant package is from 1:2 to 2:1.

According to another aspect, a water-based drilling fluid composition includes an aqueous base fluid, one or more additives, and a lubricant package. The additives are chosen from an emulsifier, a weighting material, a fluid-loss control additive, a viscosifier, and an alkali compound. The lubricant package includes water, a polyethylene glycol, and a lubricating agent. The lubricating agent includes triethanolamine, or a $C_{12}$-$C_{14}$ alcohol ethoxylate, or a combination of triethanolamine and $C_{12}$-$C_{14}$ alcohol ethoxylate. Further, the weight ratio of the polyethylene glycol to the lubricating agent in the lubricant package is from 1:2 to 2:1.

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

Drill strings for drilling subterranean wells include a drill bit and drill collars to weight the drill bit. To drill a subterranean well the drill string is inserted into a predrilled hole and is rotated to cause the drill bit to cut into the rock at the bottom of the hole. The drilling operation produces rock fragments. To remove the rock fragments from the bottom of the wellbore, a drilling fluid or a drilling fluid composition is pumped down through the drill string to the drill bit. Common categories of drilling fluids include drilling muds, packer fluids, drill-in fluids, and completion fluids. Generically, drilling fluids serve a number of functions, and with specific types of drilling fluids may specialize in a particular function or functions. The drilling fluid cools the drill bit, provides lubrication, and lifts the rock fragments known as cuttings away from the drill bit. The drilling fluid carries the cuttings upwards as the drilling fluid is recirculated back to the surface. At the surface, the cuttings are removed from the drilling fluid through a secondary operation, and the drilling fluid is recirculated back down the drill string to the bottom of the wellbore for collection of further cuttings.

Embodiments of the present disclosure are directed to lubricant packages for water-based drilling fluids and additionally to water-based drilling fluid compositions incorporating the lubricant package. The lubricant package is a combination of water, a polyethylene glycol, and a lubricating agent. The lubricating agent may comprise triethanolamine, a $C_{12}$-$C_{14}$ alcohol ethoxylate, or a combination of triethanolamine and a $C_{12}$-$C_{14}$ alcohol ethoxylate. The weight ratio of the polyethylene glycol to the lubricating agent in the lubricant package is from 1:2 to 2:1.

The lubricant package includes water. In one or more embodiments, the lubricant package comprises 70 weight percent (wt. %) to 98 wt. % water. In various embodiments, the lubricant package comprises 70 wt. % to 95 wt. % water, 75 wt. % to 98 wt. % water, 75 w. t % to 95 wt. % water, 80 wt. % to 98 wt. % water, 80 wt. % to 95 wt. % water, 85 wt. % to 98 wt. % water, or 85 wt. % to 95 wt. % water.

The lubricant package includes polyethylene glycol. The polyethylene glycol provides a lubrication and friction reducing functionality as well as a freezing point depression functionality. Specifically, addition of polyethylene glycol to a water-based drilling fluid as a component of the lubricant package results in the coefficient of friction of the lubricant package independent of the remaining components of the lubricant package. Additionally, the polyethylene glycol reduces the freezing point of the lubricant package as well as the entire water-based drilling fluid when included in the disclosed embodiments of a water-based drilling fluid.

In various embodiments, the polyethylene glycol includes polyethylene glycols having a distribution of molecular weights. In one or more embodiments, the polyethylene glycol comprises an average molecular weight of 250 to 700 grams per mole (g/mol). The polyethylene glycol may also comprise an average molecular weight of 500 to 700 g/mol, 525 to 700 g/mol, 525 to 675 g/mol, 525 to 650 g/mol, 525 to 625 g/mol, 525 to 600 g/mol, 550 to 700 g/mol, 550 to 675 g/mol, 550 to 650 g/mol, 550 to 625 g/mol, 550 to 600 g/mol, 575 to 700 g/mol, 575 to 675 g/mol, 575 to 650 g/mol, 575 to 625 g/mol, 575 to 600 g/mol, 590 to 610 g/mol, or approximately 600 g/mol. In further embodiments, the polyethylene glycol comprises an average molecular weight of 250 to 350 g/mol, 250 to 325 g/mol, 250 to 300 g/mol, 275 to 350 g/mol, 275 to 325 g/mol, 275 to 300 g/mol, 290 to 310 g/mol, or approximately 300 g/mol.

In one or more embodiments, the polyethylene glycol is a polyethylene glycol having a freezing point from 12° C. to 17° C.

In one or more embodiments, the polyethylene glycol is a polyethylene glycol having a flash point greater than 220° C. An elevated flash point of the polyethylene glycol allows the resulting drilling fluid to be utilized in high temperature and pressure conditions.

In one or more embodiments, the lubricant package includes triethanolamine. Triethanolamine has the formula $N(CH_2CH_2OH)_3$. The triethanolamine may provide an alkaline buffer functionality to the drilling fluid.

In one or more embodiments, the lubricant package comprises a $C_{12}$-$C_{14}$ alcohol ethoxylate. The $C_{12}$-$C_{14}$ alcohol ethoxylate may have Formula (I):

$R(OCH_2CH_2)_nOH$    Formula (I)

In Formula (I), R is a saturated or unsaturated, linear or branched hydrocarbyl group having from 8 to 18 carbon atoms. In embodiments, R is a saturated or unsaturated, linear or branched hydrocarbyl group having 13 carbon atoms. In embodiments, R is —$(CH_2)_m(CH_3)CHCH_3$ where m is from 9 to 11. In some embodiments, m is 9, 10, or 11. Further, in embodiments, n is from 3 to 13 including 3, 4, 5, 6, 7, 8, 9, 10, 11, 12, and 13 individually.

In some embodiments, the alcohol ethoxylate compound includes compounds having the chemical formula $C_{13}H_{27}$—$(OCH_2CH_2)_8$—OH. In one or more embodiments, owing to the reactions by which alcohol ethoxylates are prepared, the alcohol ethoxylate comprising the compound of the chemical formula $C_{13}H_{27}$—$(OCH_2CH_2)_8$—OH may include small amounts, for example less than 5 wt. %, less than 1 wt. %, less than 0.1 wt. %, or less than 0.01 wt. %, of one or more other alcohol ethoxylates having the formula R—$(OCH_2CH_2)_n$—OH in which "n" is an integer greater than or less than 8, in a range of 3 to 13. In embodiments, the alcohol ethoxylate is a condensate of synthetic branched isotridecyl alcohol with eight moles of ethylene oxide. The alcohol ethoxylate may have the chemical formula $CH_3CH(CH_3)(CH_2)_{10}$—$(OCH_2CH_2)_8$—OH.

In one or more embodiments, the alcohol ethoxylate may have a hydroxyl value of 98 to 104 mg KOH/g. The hydroxyl value may be measured in accordance with SKIM/QAD-SOP-209, which is incorporated herein by reference in its entirety.

In one or more embodiments, the alcohol ethoxylate may have a hydrophilic-lipophilic balance (HLB) of 8 to 16. The HLB may be measured according to a standard technique, such as Griffin's method which states $HLB=20\times M_h/M$ where $M_h$ is the molecular mass of the hydrophilic portion of the molecule and M is the molecular mass of the whole molecule. The resulting HLB value gives a result on a scale of from 0 to 20 in which a value of 0 indicates to a completely hydrophobic/lipophilic molecule and a value of 20 corresponds to a completely hydrophilic/lipophobic molecule. Generally, a molecule having an HLB of less than 10 is lipid-soluble (and thus water-insoluble) and a molecule having an HLB of greater than 10 is water-soluble (and thus lipid-insoluble). In various embodiments, the alcohol ethoxylate may have a hydrophilic-lipophilic balance of 9 to 15, 10 to 14.5, 11 to 14, 12 to 13.5, 12.5 to 13 or approximately 12.75.

The lubricant package comprises a combination of water, the polyethylene glycol, and the lubricating agent. The lubricating agent may comprise triethanolamine, or a $C_{12}$-$C_{14}$ alcohol ethoxylate, or triethanolamine and a $C_{12}$-$C_{14}$ alcohol ethoxylate. The individual components of the lubricant package may be formulated in various ratios to accentuate various properties. In one or more embodiments, the weight ratio of the polyethylene glycol to the lubricating agent in the lubricant package is from 1:2 to 2:1. In various embodiments, the weight ratio of the polyethylene glycol to the lubricating agent in the lubricant package is 5:9 to 9:5, 4:7 to 7:4, 3:5 to 5:3, or 2:3 to 3:2. Further, in embodiments, the weight ratio of the alcohol ethoxylate to the triethanolamine in the lubricating agent is from 0:1 to 1:0, 10:1 to 1:10, 5:1 to 1:5, 3:1 to 1:3, 2:1 to 1:2, or approximately 1:1.

The lubricant package increases lubricity and decreases friction between the drill string and the wellbore during drilling operations. A reduction in the coefficient of friction of the lubricant package, and similarly a water-based drilling fluid containing the lubricant package, provides a reduction in friction experienced between the drill string and the wellbore. In embodiments, the lubricant package has a coefficient of friction less than 20. In various further embodiments, the lubricant package has a coefficient of friction less than 19, less than 18, less than 17, less than 16, less than 15, or less than 14. The coefficient of friction may be measured in accordance with a standard lubricity coefficient test. Specifically, a lubricity testing device as commonly used by those in the drilling fluid industry may be utilized, for example, a lubricity tester from OFI Testing Equipment, Inc (OFITE), Houston, Tex. In testing, the lubricant package is positioned between a hardened steel block and rotating ring. A 150 inch-pounds (in-lb) of force is applied between the hardened steel block and rotating ring while the rotating ring spins at 60 rotations per minute (RPM). The 150 in-lb of force is equivalent to 5,000 to 10,000 PSI pressure on the lubricant package. The lubricity testing device then provides a value for the coefficient of friction for the lubricant package based on internal calculations of the lubricity testing device.

The lubricant package may be added to a water-based drilling fluid to generate a water-based drilling fluid composition which includes embodiments of the lubricant package. An example water-based drilling fluid composition incorporating the lubricant package comprises an aqueous base fluid, one or more additives including emulsifiers, weighting material, fluid-loss control additives, viscosifiers, or alkali compounds, and a lubricant package as previously described, including polyethylene glycol and one or more of triethanolamine and a $C_{12}$-$C_{14}$ alcohol ethoxylate.

In one or more embodiments of the aqueous base fluid may include water or a combination of oil and water. An aqueous base fluid may be any suitable fluid such as water or a solution containing both water and one or more organic or inorganic compounds dissolved in the water or otherwise completely miscible with the water. The water in the aqueous base fluid may include one or more of fresh water, well water, filtered water, distilled water, sea water, salt water, produced water, formation brine, other types of water, or combinations of waters. The water-based drilling fluid compositions comprising oil in the aqueous base fluid may have a natural oil, a synthetic oil, or a combination thereof.

The water-based drilling fluid composition may have an amount of the aqueous base fluid sufficient to allow the water-based drilling fluid composition to be circulated to the drill bit at the bottom of a wellbore and back to the surface. In embodiments, the water-based drilling fluid composition may include from 20 wt. % to 99 wt. % base fluid based on the total weight of the water-based drilling fluid composition. For example, the water-based drilling fluid composition may have from 20 wt. % to 80 wt. %, from 20 wt. % to 70 wt. %, from 20 wt. % to 60 wt. %, from 20 wt. % to 50 wt. %, from 20 wt. % to 40 wt. %, from 23 wt. % to 99 wt. %, from 23 wt. % to 80 wt. %, from 23 wt. % to 70 wt. %, from 23 wt. % to 60 wt. %, from 23 wt. % to 50 wt. %, from 23 wt. % to 40 wt. %, from 24 wt. % to 99 wt. %, from 24 wt. % to 80 wt. %, from 24 wt. % to 70 wt. %, from 24 wt. % to 60 wt. %, from 24 wt. % to 50 wt. %, from 24 wt. % to 40 wt. %, from 25 wt. % to 99 wt. %, from 25 wt. % to 80 wt. %, from 25 wt. % to 70 wt. %, from 25 wt. % to 60 wt. %, from 25 wt. % to 50 wt. %, or from 25 wt. % to 40 wt. % aqueous base fluid based on the total weight of the water-based drilling fluid composition. Said another way, the drilling fluids may include from 5 pounds per barrel (lb/bbl) to 850 lb/bbl, 25 lb/bbl to 750 lb/bbl, 50 lb/bbl to 600 lb/bbl, or 75 lb/bbl to 350 lb/bbl of base fluid.

In embodiments, the water-based drilling fluid composition may include a weighting material. In some embodiments, the weighting material may be a particulate solid having a specific gravity (SG) sufficient to increase the density of the drilling fluid composition by a certain amount without adding excessive weighting material such that the drilling fluid composition cannot be circulated through the wellbore. The weighting material may have a specific gravity (SG) of from 2 grams per cubic centimeter ($g/cm^3$) to 6 $g/cm^3$. Examples of weighting materials include, but are not limited to, barite (minimum SG of 4.20 $g/cm^3$), hematite (minimum SG of 5.05 $g/cm^3$), calcium carbonate (minimum SG of 2.7-2.8 $g/cm^3$), siderite (minimum SG of 3.8 $g/cm^3$), ilmenite (minimum SG of 4.6 $g/cm^3$), other weighting materials, or any combination of these weighting materials. Some example drilling fluid compositions may include barite as the solid.

The water-based drilling fluid composition may include an amount of weighting material sufficient to increase the density of the drilling fluid composition to allow the drilling fluid composition to support the wellbore and prevent fluids in downhole formations from flowing into the wellbore. In embodiments, the water-based drilling fluid composition may include from 1 wt. % to 80 wt. % weighting material based on the total weight of the water-based drilling fluid composition. In some embodiments, the water-based drilling fluid composition may include from 1 wt. % to 75 wt. %, from 1 wt. % to 74 wt. %, from 1 wt. % to 73 wt. %, from 1 wt. % to 70 wt. %, from 1 wt. % to 60 wt. %, from 20 wt. % to 80 wt. %, from 20 wt. % to 75 wt. %, from 20 wt. % to 74 wt. %, from 20 wt. % to 73 wt. %, from 20 wt. % to 70 wt. %, from 20 wt. % to 60 wt. %, from 50 wt. % to 80 wt. %, from 50 wt. % to 75 wt. %, from 50 wt. % to 74 wt. %, from 50 wt. % to 73 wt. %, from 50 wt. % to 70 wt. %, from 50 wt. % to 60 wt. %, from 60 wt. % to 80 wt. %, or from 60 wt. % to 75 wt. % weighting material, based on the total weight of the water-based drilling fluid composition. Said another way, the drilling fluids may include from 5 ppb to 850 ppb, 50 ppb to 750 ppb, 150 ppb to 700 ppb, or 200 ppb to 650 ppb of weighting material.

The drilling fluid composition may have a density of from 60 pounds of mass per cubic foot ($lbm/ft^3$) to 155 $lbm/ft^3$, from 60 $lbm/ft^3$ to 130 $lbm/ft^3$, from 60 $lbm/ft^3$ to 120 $lbm/ft^3$, from 70 $lbm/ft^3$ to 140 $lbm/ft^3$, from 70 $lbm/ft^3$ to 125 $lbm/ft^3$, from 70 $lbm/ft^3$ to 110 $lbm/ft^3$, from 80 $lbm/ft^3$ to 120 $lbm/ft^3$, from 80 $lbm/ft^3$ to 110 $lbm/ft^3$, or from 80 $lbm/ft^3$ to 100 $lbm/ft^3$, where 1 $lbm/ft^3$ is approximately 16.02 kilograms per cubic meter ($kg/m^3$). In some embodiments, the drilling fluid composition may have a density that is approximately equal to 90 $lbm/ft^3$ (1,442 $kg/m^3$), alternatively commonly referenced as 90 pcf.

The water-based drilling fluid composition may include at least one solid-phase component. Examples of solid-phase components in the water-based drilling fluid compositions may include, but are not limited to, the weighting materials, starch, soda ash, bentonite, lime, sodium sulfite, other solid-phase component, or combinations of these solid-phase components. All of the solid-phase components together make up a total solids content of the water-based drilling fluid composition. In some embodiments, the water-based drilling fluid composition may have a total solids content of equal to or greater than 50 wt. % based on the total weight of the water-based drilling fluid composition. Alternatively, in other embodiments, the water-based drilling fluid composition may have a solids content of equal to or greater than 60 wt. % based on the total weight of the water-based drilling fluid composition.

The water-based drilling fluid compositions may optionally include one or a plurality of additives to enhance the properties and characteristics of the water-based drilling fluid composition. Examples of the additives include, but are not limited to, emulsifiers, fluid-loss control additives, viscosifiers (viscosity control agents), alkali compounds, or combinations of these. The water-based drilling fluid composition may also optionally include pH buffers, electrolytes, glycols, glycerols, dispersion aids, corrosion inhibitors, defoamers, and other additives or combinations of additives. In embodiments, the water-based drilling fluid composition may optionally include a viscosifier to impart non-Newtonian fluid rheology to the water-based drilling fluid composition to facilitate lifting and conveying rock cuttings to the surface of the wellbore. Examples of viscosifiers may include, but are not limited to, xanthan gum polymer (XC polymer), bentonite, polyacrylamide, polyanionic cellulose, or combinations of these viscosifiers. In some embodiments, the water-based drilling fluid composition may optionally include xanthan gum polymer, which is a polysaccharide secreted by the bacteria *Xanthomonas Campestris* (XC). An example water-based drilling fluid composition may optionally include from 0.03 to 1 lb/bbl of a xanthan gum polymer. Unless otherwise stated, the weight percent of an additive in the water-based drilling fluid composition is based on the total weight of the water-based drilling fluid composition. In some embodiments, the water-based drilling fluid composition may optionally include from 0.03 to 1 lb/bbl bentonite. The water-based drilling fluid composition may optionally include other suitable viscosifiers without deviating from the scope of the present subject matter.

The water-based drilling fluid composition may optionally include at least one pH adjuster. In embodiments, the water-based drilling fluid composition may optionally include at least one alkali compound. Examples of alkali compounds may include, but are not limited to, lime (calcium hydroxide or calcium oxide), soda ash (sodium carbonate), sodium hydroxide, potassium hydroxide, other strong base, or combinations of these alkali compounds. The alkali compounds may react with gases, such as $CO_2$ or $H_2S$ for example, encountered by the drilling fluid composition during drilling operations to prevent the gases from hydrolyzing components of the water-based drilling fluid composition. Some example water-based drilling fluid compositions may optionally include from 0.33 to 10 lb/bbl of soda ash. Other example water-based drilling fluid compositions may optionally include from 0.3 to 10 lb/bbl of lime. In embodiments, the water-based drilling fluid composition may have a pH of from 7 to 12, from 7 to 10.5, from 7 to 10, from 9 to 12, from 9 to 10.5, from 9 to 10, from 9.5 to 12, from 9.5 to 10.5, from 9.5 to 10, from 7.5 to 9, from 7.5 to 9.5, or from 10 to 12. In some embodiments, the water-based drilling fluid composition may have a pH of from 9 to 10.5.

The water-based drilling fluid composition may optionally include at least one emulsifier. In one or more embodiments, the drilling fluid composition may include from 7 ppb to 25 ppb of emulsifier, from 8 ppb to 20 ppb of emulsifier, or from 9 ppb to 15 ppb of emulsifier. In one or more embodiments, the emulsifier may be an invert emulsifier and oil-wetting agent for synthetic based drilling fluid systems such as LE SUPERMUL™ commercially available from Halliburton Energy Services, Inc.

The water-based drilling fluid composition may optionally include at least one fluid-loss control additive. The drilling fluid composition may include from 1 ppb to 10 ppb of fluid-loss control additive, from 1 ppb to 5 ppb of fluid-loss control additive, from 1.5 ppb to 8 ppb of fluid-loss control additive, or from 1.5 ppb to 2.5 ppb of fluid-loss control additive. In one or more embodiments, the fluid-loss additive may be a polyaninoic cellulose. The fluid-loss additive may additionally or alternatively be a modified starch, a xanthan gum, or 2-acrylamido-2-methyl propane sulfonic acid (AMPS).

In embodiments, the water-based drilling fluid composition also provides a cooling and lubrication functionality for cooling and lubrication of the bit and drill string utilized in boring operations. Embodiments of the lubricant package and water-based drilling fluids comprising the lubricant package are formulated to provide improved lubrication functionality for lubrication of the bit and drill string utilized in boring operations. The lubricant package imparts enhanced lubricity to the water-based drilling fluid composition thereby providing increased lubrication and reduced friction between the drill string, pipe, and wellbore during drilling operations. The synergistic effect of both the polyethylene glycol and triethanolamine or the polyethylene glycol and alcohol ethoxylate imparts the enhanced lubrication and friction reduction. Without wishing to be bound by theory it is believed there is a hydrophilic interaction between the head groups of the polyethylene glycol-triethaniolamine and polyethylene glycol-alcohol ethoxylate to impart the enhanced lubrication and friction reduction.

EXAMPLES

The following examples illustrate one or more additional features of the present disclosure. It should be understood that these examples are not intended to limit the scope of the disclosure or the appended claims in any manner.

In the following examples, lubricating fluids with varying amounts of water, polyethylene glycol, and lubricating agent were prepared. The polyethylene glycol, the lubricating agent, and both the freezing point depressant and lubricating agent were tested in combination with water. The testing included combinations of water, polyethylene glycol, and lubricating agent encompassed by embodiments of the lubricant package previously described. The physical characteristics of the polyethylene glycols used in the lubricating fluids are provided in Tables 1 and 2. The physical characteristics of the alcohol ethoxylate are provided in Table 3. The coefficients of friction of the various tested lubricating fluids are described in Table 4.

Example 1 (Comparative)

Water and Polyethylene Glycol (MW 300)

A lubricating fluid formulated from 250 milliliters (mL) of water and 15 grams (g) of polyethylene glycol with a molecular weight of 300 was prepared as an Example 1 for comparison with embodiments of the lubricant package. The constituents of Example 1 were simultaneously mixed for 5 minutes to prepare Example 1. Details of the physical properties of the polyethylene glycol (MW 300) are provided in Table 1.

TABLE 1

| Physical Properties of Polyethylene Glycol (MW 300) | | |
|---|---|---|
| Property | Test Method | Value |
| Molecular Weight | | 300 |
| Appearance at 25° C. | SKIMS/QAD-SOP-168 | Clear Viscous Liquid |
| Hydroxyl No. (mgKOH/g) | SKIMS/QAD-SOP-209 | 356.0-394.0 |
| Water (%), Max. | ASTM-E-203 | 0.5 |
| Color (APHA), at 25° C., Max. | ASTM-D-1209 | 40 |
| pH at 25° C. for 5 wt. % in Aqueous Solution | ASTM-D-4252 | 4.5-7.5 |
| Density at 25° C., g/ml | | 1.12-1.13 |
| Freezing Point Range (° C.) | | 5-9 |
| Flash Point (° C.) | | Over 150 |
| Ash Content %, Max. | | 0.1 |

Example 2 (Comparative)

Water and Polyethylene Glycol (MW 600)

A lubricating fluid formulated from 250 mL of water and 15 g of polyethylene glycol with a molecular weight of 600 was prepared as an Example 2 for comparison with embodiments of the lubricant package. The constituents of Example 2 were simultaneously mixed for 5 minutes to prepare Example 2. Details of the physical properties of the polyethylene glycol (MW 600) are provided in Table 2.

TABLE 2

| Physical Properties of Polyethylene Glycol (MW 600) | | |
|---|---|---|
| Property | Test Method | Value |
| Molecular Weight | | 600 |
| Appearance at 25° C. | SKIMS/QAD-SOP-168 | Clear Viscous Liquid |
| Hydroxyl No. (mgKOH/g) | SKIMS/QAD-SOP-209 | 178-197 |
| Water (%), Max. | ASTM-E-203 | 0.5 |
| Color (APHA), at 25° C., Max. | ASTM-D-1209 | 40 |
| pH at 25° C. for 5 wt. % in Aqueous Solution | ASTM-D-4252 | 4.5-7.5 |
| Density at 25° C., g/ml | — | 1.1258 |
| Freezing Point Range (° C.) | — | 12-17 |
| Flash Point (° C.) | — | Over 220 |
| Ash Content %, Max. | — | 0 |

Example 3 (Comparative)

Water and Triethanolamine

A lubricating fluid formulated from 250 mL of water and 15 g of triethanolamine was prepared as an Example 3 for comparison with embodiments of the lubricant package. The constituents of Example 3 were simultaneously mixed for 5 minutes to prepare Example 3. Details of the physical properties of the triethanolamine are provided in Table 3.

TABLE 3

Physical Properties of Triethanolamine

| Property | Test Method | Value |
|---|---|---|
| Appearance at 30° C. | SKIMS/QAD-SOP-168 | Clear Liquid |
| Water (%), Max. | ASTM-E-203 | 0.2 |
| Freezing Point (° C.) | — | 21 |
| Flash Point (° C.) | — | Over 190 |
| Boiling Point (° C.) | — | 360 |

Example 4 (Comparative)

Water and Alcohol Ethoxylate

A lubricating fluid formulated from 250 mL of water and 15 g of an alcohol ethoxylate was formulated as an Example 4 for comparison with embodiments of the lubricant package. The constituents of Example 4 were simultaneously mixed for 5 minutes to prepare Example 4. Details of the physical properties of the alcohol ethoxylate are provided in Table 4. Specifically, the alcohol ethoxylate was a $C_{13}$ alcohol ethoxylate and more specifically had the chemical formula $CH_3CH(CH_3)(CH_2)_{10}$—$(OCH_2CH_2)_8$—OH.

TABLE 4

Physical Properties of Alcohol Ethoxylate

| Property | Test Method | Value |
|---|---|---|
| Appearance at 25° C. | SKIMS/QAD-SOP-168 | Liquid |
| Hydroxyl No. (mgKOH/g) | SKIMS/QAD-SOP-209 | 98-104 |
| Water (%), Max. | ASTM-E-203 | 0.5 |
| pH at 25° C. for 5 wt. % in Aqueous Solution | ASTM-D-4252 | 5-7 |
| Cloud point (5 g + 25 g of 25% w/w butyl diglycol (BDG) in DI water), ° C. | ASTM-D-2024 | 78-83 |
| HLB | Calculated | 12.75 |

Example 5

Water, Triethanolamine, and Polyethylene Glycol (MW 600)

A lubricant package in accordance with embodiments of this disclosure formulated from 250 mL of water, 15 g of triethanolamine, and 15 g of polyethylene glycol (MW 600) was prepared as an Example 5. The constituents of Example 5 were simultaneously mixed for 5 minutes to prepare Example 5.

Example 6

Water, Alcohol Ethoxylate, and Polyethylene Glycol (MW 600)

A lubricant package in accordance with embodiments of this disclosure formulated from 250 mL of water, 15 g of $CH_3CH(CH_3)(CH_2)_{10}$—$(OCH_2CH_2)_8$—OH alcohol ethoxylate, and 15 g of polyethylene glycol (MW 600) was prepared as an Example 6. The constituents of Example 6 were simultaneously mixed for 5 minutes to prepare Example 6.

The lubricating fluids of Examples 1-4 (Comparative Examples) and Examples 5-6 were evaluated to determine the coefficient of friction for each sample. A lubricity testing device as commonly used by those in the drilling fluid industry was utilized to determine the coefficient of friction for each sample. Specifically, a lubricity tester from OFI Testing Equipment, Inc (OFITE), Houston, Tex. was utilized. In testing, each lubricating fluids of Comparative Examples 1-4 and Inventive Examples 1-2 were individually positioned between a hardened steel block and rotating ring. A force of 150 inch-pounds (in-lb) was applied between the hardened steel block and the rotating ring while the rotating ring spun at 60 rotations per minute (RPM). The lubricity testing device recorded the force required to spin the rotating ring and based on internal calculations the lubricity testing device provided a coefficient of friction value for each of Examples 1-4 (Comparative) and Examples 5-6. The results of these measurements for the lubricating fluids of Examples 1-4 (Comparative) and Examples 5-6 are provided in Table 5. Table 4 also includes a calculated reduction in the coefficient of friction compared to a pure water sample.

TABLE 5

Evaluation of the Properties of the Lubricating Fluids of Examples 1-4 (Comparative) and Examples 5-6

| Lubricating Fluid | Formulation | Coefficient of Friction (Torque) | Reduction in Coefficient of Friction |
|---|---|---|---|
| Example 1 (Comparative) | 250 mL Water | 0.354 | — |
| | 250 mL Water + 15 g Polyethylene Glycol (MW 300) | 0.306 | 13.56% |
| Example 2 (Comparative) | 250 mL Water | 0.354 | — |
| | 250 mL Water + 15 g Polyethylene Glycol (MW 600) | 0.302 | 14.69% |
| Example 3 (Comparative) | 250 mL Water | 0.352 | — |
| | 250 mL Water + 15 g Triethanolamine | 0.335 | 4.83% |
| Example 4 (Comparative) | 250 mL Water | 0.346 | — |
| | 250 mL Water + 15 g $C_{13}$ Alcohol Ethoxylate | 0.224 | 35.26% |
| Example 5 | 250 mL Water | 0.358 | — |
| | 250 mLWater + 15 g Triethanolamine + 15 g Polyethylene Glycol (MW 600) | 0.163 | 54.47% |
| Example 6 | 250 mL Water | 0.358 | — |
| | 250 mL Water + 15 g $C_{13}$ Alcohol Ethoxylate + 15 g Polyethylene Glycol (MW 600) | 0.132 | 63.13% |

As shown in Table 5, the lubricant package of Example 5, which included the triethanolamine and polyethylene glycol, resulted in an over 54% reduction in the coefficient of friction compared to just the base water. Similarly, the lubricant package of Example 6, which included the $C_{13}$ alcohol ethoxylate and polyethylene glycol, resulted in an over 63% reduction in the coefficient of friction compared to just the base water. The synergistic effect of the $C_{13}$ alcohol ethoxylate and polyethylene glycol or triethanolamine and polyethylene glycol in combination in reducing the coefficient of friction compared to the components of the lubricating fluid in isolation is evident. Specifically, the polyethylene glycol (MW 600) in isolation only had a 14.69% reduction in the coefficient of friction compared to just the base water, the triethanolamine in isolation only had a 4.83% reduction in the coefficient of friction compared to just the base water, and the $C_{13}$ alcohol ethoxylate in isolation only had a 35.26% reduction in the coefficient of friction compared to just the base water. An 18.81% reduction when the polyethylene glycol (600 MW) and triethanolamine are used in combination would be expected based on the combination of a 14.69% and 4.83% reduction; however, the much greater 54.47% reduction is noted. Similarly, a 44.77% reduction when the polyethylene glycol (600 MW) and $C_{13}$ alcohol ethoxylate are used in combination would be expected based on the combination of a 14.69% and 35.26% reduction; however, the much greater 63.13% reduction is noted.

It should be understood that the various aspects of the method of making BTX compounds including benzene, toluene, and xylene, and the composite zeolite catalyst utilized in the same are described and such aspects may be utilized in conjunction with various other aspects.

In a first aspect, the disclosure provides a lubricant package for water based drilling fluids. The lubricant package includes water, a polyethylene glycol, and a lubricating agent. The lubricating agent comprises triethanolamine, or a $C_{12}$-$C_{14}$ alcohol ethoxylate, or a combination of triethanolamine and $C_{12}$-$C_{14}$ alcohol ethoxylate. The weight ratio of the polyethylene glycol to the lubricating agent in the lubricant package is from 1:2 to 2:1.

In a second aspect, the disclosure provides the lubricant package of the first aspect, in which the polyethylene glycol comprises polyethylene glycols having a distribution of molecular weights and an average molecular weight of 500 to 700 grams/mole.

In a third aspect, the disclosure provides the lubricant package of the first aspect, in which the polyethylene glycol comprises polyethylene glycols having a distribution of molecular weights and with an average molecular weight of 590 to 610 grams/mole.

In a fourth aspect, the disclosure provides the lubricant package of the first aspect, in which the polyethylene glycol comprises polyethylene glycols having a distribution of molecular weights and an average molecular weight of 250 to 350 grams/mole.

In a fifth aspect, the disclosure provides the lubricant package of any of the first through fourth aspects, in which the polyethylene glycol is a polyethylene glycol having a freezing point from 12° C. to 17° C.

In a sixth aspect, the disclosure provides the lubricant package of any of the first through fifth aspects, in which the polyethylene glycol is a polyethylene glycol having a flash point greater than 220° C.

In a seventh aspect, the disclosure provides the lubricant package of any of the first through sixth aspects, in which the lubricating agent comprises triethanolamine or a combination of triethanolamine and $C_{12}$-$C_{14}$ alcohol ethoxylate.

In an eighth aspect, the disclosure provides the lubricant package of any of the first through sixth aspects, in which the lubricating agent comprises $C_{12}$-$C_{14}$ alcohol ethoxylate or a combination of triethanolamine and $C_{12}$-$C_{14}$ alcohol ethoxylate.

In a ninth aspect, the disclosure provides the lubricant package of any of the first through eighth aspects, in which the $C_{12}$-$C_{14}$ alcohol ethoxylate is a $C_{13}$ alcohol ethoxylate.

In a tenth aspect, the disclosure provides the lubricant package of any of the first through ninth aspects, in which the alcohol ethoxylate is a condensate of synthetic branched isotridecyl alcohol with three to thirteen moles of ethylene oxide.

In an eleventh aspect, the disclosure provides the lubricant package of any of the first through tenth aspects, in which the alcohol ethoxylate is a condensate of synthetic branched isotridecyl alcohol with eight moles of ethylene oxide.

In a twelfth aspect, the disclosure provides the lubricant package of any of the first through eleventh aspects, in which the alcohol ethoxylate has the chemical formula $CH_3CH(CH_3)(CH_2)_{10}$—$(OCH_2CH_2)_8$—OH.

In a thirteenth aspect, the disclosure provides the lubricant package of any of the first through twelfth aspects, in which the lubricant package comprises a $C_{12}$-$C_{14}$ alcohol ethoxylate having a hydroxyl value of 98-104 mg KOH/g measured according to SKIMS/QAD-SOP-209.

In a fourteenth aspect, the disclosure provides the lubricant package of any of the first through thirteenth aspects, in which the lubricant package comprises a $C_{12}$-$C_{14}$ alcohol ethoxylate having a hydrophilic-lipophilic balance of 8 to 16.

In a fifteenth aspect, the disclosure provides the lubricant package of any of the first through thirteenth aspects, in which the lubricant package comrpises a $C_{12}$-$C_{14}$ alcohol ethoxylate having a hydrophilic-lipophilic balance of 12.5 to 13.0.

In a sixteenth aspect, the disclosure provides the lubricant package of any of the first through fifteenth aspects, in which the weight ratio of the polyethylene glycol to the lubricating agent in the lubricant package is from 2:3 to 3:2.

In a seventeenth aspect, the disclosure provides the lubricant package of any of the first through sixteenth aspects, in which the lubricant package comprises 70 wt. % to 98 wt. % water.

In an eighteenth aspect, the disclosure provides the lubricant package of any of the first through seventeenth aspects, in which the lubricant package comprises 85 wt. % to 95 wt. % water.

In a nineteenth aspect, the disclosure provides the lubricant package of any of the first through eighteenth aspects, in which the lubricant package has a coefficient of friction less than 20.

In a twentieth aspect, the disclosure provides the lubricant package of any of the first through eighteenth aspects, in which the lubricant package has a coefficient of friction less than 18.

In a twenty-first aspect, the disclosure provides the lubricant package of any of the first through eighteenth aspects, in which the lubricant package has a coefficient of friction less than 14.

In a twenty-second aspect, the disclosure provides a water-based drilling fluid composition. The water-based drilling fluid composition comprises an aqueous base fluid, one or more additives chosen from a weighting material, a fluid-loss control additive, a viscosifier, and an alkali compound, and a lubricant package. The lubricant package comprises water, a polyethylene glycol, a lubricating agent. The lubricating agent comprises triethanolamine, or a $C_{12}$-$C_{14}$ alcohol ethoxylate, or a combination of triethanolamine and $C_{12}$-$C_{14}$ alcohol ethoxylate. The weight ratio of the polyethylene glycol to the lubricating agent is from 1:2 to 2:1.

In a twenty-third aspect, the disclosure provides the drilling fluid of the twenty-second aspect, in which the polyethylene glycol comprises polyethylene glycols having a distribution of molecular weights and an average molecular weight of 500 to 700 grams/mole.

In a twenty-fourth aspect, the disclosure provides the drilling fluid of the twenty-second aspect, in which the polyethylene glycol comprises polyethylene glycols having a distribution of molecular weights and with an average molecular weight of 590 to 610 grams/mole.

In a twenty-fifth aspect, the disclosure provides the drilling fluid of the twenty-second aspect, in which the polyethylene glycol comprises polyethylene glycols having a distribution of molecular weights and an average molecular weight of 250 to 350 grams/mole.

In a twenty-sixth aspect, the disclosure provides the drilling fluid of any of the twenty-second through twenty-fifth aspects, in which the polyethylene glycol is a polyethylene glycol having a freezing point from 12° C. to 17° C.

In a twenty-seventh aspect, the disclosure provides the drilling fluid of any of the twenty-second through twenty-sixth aspects, in which the polyethylene glycol is a polyethylene glycol having a flash point greater than 220° C.

In a twenty-eighth aspect, the disclosure provides the drilling fluid of any of the twenty-second through twenty-seventh aspects, in which the lubricating agent comprises triethanolamine or a combination of triethanolamine and $C_{12}$-$C_{14}$ alcohol ethoxylate.

In a twenty-ninth aspect, the disclosure provides the drilling fluid of any of the twenty-second through twenty-seventh aspects, in which the lubricating agent comprises $C_{12}$-$C_{14}$ alcohol ethoxylate or a combination of triethanolamine and $C_{12}$-$C_{14}$ alcohol ethoxylate.

In a thirtieth aspect, the disclosure provides the drilling fluid of any of the twenty-second through twenty-ninth aspects, in which the $C_{12}$-$C_{14}$ alcohol ethoxylate is a $C_{13}$ alcohol ethoxylate.

In a thirty-first aspect, the disclosure provides the drilling fluid of any of the twenty-second through thirtieth aspects, in which the alcohol ethoxylate is a condensate of synthetic branched isotridecyl alcohol with three to thirteen moles of ethylene oxide.

In a thirty-second aspect, the disclosure provides the drilling fluid of any of the twenty-second through thirty-first aspects, in which the alcohol ethoxylate is a condensate of synthetic branched isotridecyl alcohol with eight moles of ethylene oxide.

In a thirty-third aspect, the disclosure provides the drilling fluid of any of the twenty-second through thirty-second aspects, in which the alcohol ethoxylate has the chemical formula $CH_3CH(CH_3)(CH_2)_{10}$—$(OCH_2CH_2)_8$—$OH$.

In a thirty-fourth aspect, the disclosure provides the drilling fluid of any of the twenty-second through thirty-third aspects, in which the drilling fluid comprises a $C_{12}$-$C_{14}$ alcohol ethoxylate having a hydroxyl value of 98-104 mg KOH/g measured according to SKIMS/QAD-SOP-209.

In a thirty-fifth aspect, the disclosure provides the drilling fluid of any of the twenty-second through thirty-fourth aspects, in which the drilling fluid comprises a $C_{12}$-$C_{14}$ alcohol ethoxylate having a hydrophilic-lipophilic balance of 8 to 16.

In a thirty-sixth aspect, the disclosure provides the drilling fluid of any of the twenty-second through thirty-fifth aspects, in which the drilling fluid comprises a $C_{12}$-$C_{14}$ alcohol ethoxylate having a hydrophilic-lipophilic balance of 12.5 to 13M.

In a thirty-seventh aspect, the disclosure provides the drilling fluid of any of the twenty-second through thirty-sixth aspects, in which the weight ratio of the polyethylene glycol to the lubricating agent in the lubricant package is from 2:3 to 3:2.

In a thirty-eighth aspect, the disclosure provides the drilling fluid of any of the twenty-second through thirty-seventh aspects, in which the lubricant package comprises 70 wt. % to 98 wt. % water.

In a thirty-ninth aspect, the disclosure provides the drilling fluid of any of the twenty-second through thirty-eighth aspects, in which the lubricant package comprises 85 wt. % to 95 wt. % water.

In a fortieth aspect, the disclosure provides the drilling fluid of any of the twenty-second through thirty-ninth aspects, in which the lubricant package has a coefficient of friction less than 20.

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it should be apparent to those skilled in the art that various modifications and variations can be made to the described embodiments without departing from the spirit and scope of the claimed subject matter. Thus it is intended that the specification cover the modifications and variations of the various described embodiments.

What is claimed is:

1. A lubricant package for water based drilling fluids, the lubricant package comprising:
   water;
   a polyethylene glycol having a general formula in accordance with H—(O—$CH_2$—$CH_2$)$_n$—OH with n representing a distribution of integers to provide an average molecular weight of 250 to 700 grams/mole; and
   a lubricating agent comprising triethanolamine, or a $C_{12}$-$C_{14}$ alcohol ethoxylate, or a combination of triethanolamine and $C_{12}$-$C_{14}$ alcohol ethoxylate,
   in which the weight ratio of the polyethylene glycol to the lubricating agent in the lubricant package is from 1:2 to 2:1.

2. The lubricant package of claim 1, in which the polyethylene glycol comprises polyethylene glycols having a distribution of molecular weights and an average molecular weight of 500 to 700 grams/mole.

3. The lubricant package of claim 1, in which the polyethylene glycol comprises polyethylene glycols having a distribution of molecular weights and an average molecular weight of 250 to 350 grams/mole.

4. The lubricant package of claim 1, in which the lubricating agent comprises triethanolamine or a combination of triethanolamine and $C_{12}$-$C_{14}$ alcohol ethoxylate.

5. The lubricant package of claim 1, in which the lubricating agent comprises $C_{12}$-$C_{14}$ alcohol ethoxylate or a combination of triethanolamine and $C_{12}$-$C_{14}$ alcohol ethoxylate.

6. The lubricant package of claim 1, in which the $C_{12}$-$C_{14}$ alcohol ethoxylate is a $C_{13}$ alcohol ethoxylate.

7. The lubricant package of claim 1, in which the alcohol ethoxylate is a condensate of synthetic branched isotridecyl alcohol with three to thirteen moles of ethylene oxide.

8. The lubricant package of claim 1, in which the alcohol ethoxylate is a condensate of synthetic branched isotridecyl alcohol with eight moles of ethylene oxide.

9. The lubricant package of any of claim 1, in which the alcohol ethoxylate has the chemical formula $CH_3CH(CH_3)(CH_2)_{10}$—$(OCH_2CH_2)_8$—OH.

10. The lubricant package of claim 1, comprising a $C_{12}$-$C_{14}$ alcohol ethoxylate having a hydroxyl value of 98-104 mg KOH/g measured according to SKIMS/QAD-SOP-209.

11. The lubricant package of claim 1, comprising a $C_{12}$-$C_{14}$ alcohol ethoxylate having a hydrophilic-lipophilic balance of 8 to 16.

12. The lubricant package of claim 1, in which the weight ratio of the polyethylene glycol to the lubricating agent in the lubricant package is from 2:3 to 3:2.

13. The lubricant package of claim 1, in which the lubricant package comprises 70 wt. % to 98 wt. % water.

14. The lubricant package of claim 1, in which the lubricant package has a coefficient of friction less than 20.

15. A water-based drilling fluid composition comprising:
an aqueous base fluid;
one or more additives chosen from a weighting material, a fluid-loss control additive, a viscosifier, and an alkali compound; and
a lubricant package comprising:
water;
a polyethylene glycol having a general formula in accordance with H—(O—$CH_2$—$CH_2$)$_n$—OH with n representing a distribution of integers to provide an average molecular weight of 250 to 700 grams/mole; and
a lubricating agent comprising triethanolamine, or a $C_{12}$-$C_{14}$ alcohol ethoxylate, or a combination of triethanolamine and $C_{12}$-$C_{14}$ alcohol ethoxylate,
in which the weight ratio of the polyethylene glycol to the lubricating agent is from 1:2 to 2:1.

16. The water-based drilling fluid composition of claim 15, in which the polyethylene glycol comprises polyethylene glycols having a distribution of molecular weights and with an average molecular weight of 590 to 610 grams/mole.

17. The water-based drilling fluid composition of claim 15, in which the lubricating agent comprises triethanolamine or a combination of triethanolamine and $C_{12}$-$C_{14}$ alcohol ethoxylate.

18. The water-based drilling fluid composition of claim 15, in which the lubricating agent comprises $C_{12}$-$C_{14}$ alcohol ethoxylate or a combination of triethanolamine and $C_{12}$-$C_{14}$ alcohol ethoxylate.

19. The water-based drilling fluid composition of claim 15, in which the alcohol ethoxylate is a condensate of synthetic branched isotridecyl alcohol with eight moles of ethylene oxide.

20. The water-based drilling fluid composition of claim 15, in which the weight ratio of the polyethylene glycol to the lubricating agent in the lubricant package is from 2:3 to 3:2.

* * * * *

UNITED STATES PATENT AND TRADEMARK OFFICE
CERTIFICATE OF CORRECTION

PATENT NO. : 11,098,232 B2
APPLICATION NO. : 16/856288
DATED : August 24, 2021
INVENTOR(S) : Abdullah Al-Yami et al.

Page 1 of 1

It is certified that error appears in the above-identified patent and that said Letters Patent is hereby corrected as shown below:

On the Title Page

In page 4, Column 1, item (56), other publications, cite no. 29, delete "May 1, 2017" and insert --May 4, 2017--, therefor.

In page 5, Column 1, item (56), other publications, cite no. 10, delete "ethoxylatest_jcr_contents" and insert --ethoxylates/_jcr_contents--, therefor.

In the Specification

In Column 2, Line(s) 47, delete "75 w.t%" and insert --75 wt.%--, therefor.

In Column 13, Line(s) 65, delete "13M." and insert --13.0.--, therefor.

Signed and Sealed this
Fifteenth Day of November, 2022

Katherine Kelly Vidal
*Director of the United States Patent and Trademark Office*